United States Patent
Sebastian et al.

(10) Patent No.: US 10,199,622 B2
(45) Date of Patent: Feb. 5, 2019

(54) BATTERY CELL AND METHOD FOR CONTROLLING ION FLOW WITHIN THE BATTERY CELL

(71) Applicants: Robert Bosch GmbH, Stuttgart (DE); Lithium Energy and Power GmbH & Co. KG, Stuttgart (DE)

(72) Inventors: Georg Sebastian, Marbach A.N. (DE); Calin Iulius Wurm, Meltingen (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 15/155,298

(22) Filed: May 16, 2016

(65) Prior Publication Data
US 2016/0336566 A1    Nov. 17, 2016

(30) Foreign Application Priority Data
May 15, 2015 (EP) .................... 15167885

(51) Int. Cl.
| | |
|---|---|
| *H01M 2/16* | (2006.01) |
| *H01M 4/66* | (2006.01) |
| *H01M 4/38* | (2006.01) |
| *H01M 4/131* | (2010.01) |
| *H01M 4/134* | (2010.01) |
| *H01M 4/525* | (2010.01) |
| *H01M 10/0525* | (2010.01) |
| *H01M 10/0587* | (2010.01) |

(Continued)

(52) U.S. Cl.
CPC ....... *H01M 2/1646* (2013.01); *H01M 2/1686* (2013.01); *H01M 2/345* (2013.01); *H01M 4/131* (2013.01); *H01M 4/134* (2013.01); *H01M 4/386* (2013.01); *H01M 4/525* (2013.01); *H01M 4/661* (2013.01); *H01M 10/0525* (2013.01); *H01M 10/0587* (2013.01); *H01M 10/4235* (2013.01); *H01M 10/44* (2013.01); *H01M 2004/027* (2013.01); *H01M 2004/028* (2013.01); *H01M 2200/00* (2013.01); *H01M 2220/20* (2013.01)

(58) Field of Classification Search
None
See application file for complete search history.

(56) References Cited

U.S. PATENT DOCUMENTS

| | | |
|---|---|---|
| 2005/0208383 A1 | 9/2005 | Totsuka et al. |
| 2013/0017432 A1 | 1/2013 | Roumi |

(Continued)

FOREIGN PATENT DOCUMENTS

| | | |
|---|---|---|
| CN | 104103791 | 10/2014 |
| DE | 102012217451 | 4/2014 |

(Continued)

*Primary Examiner* — Daniel S Gatewood
(74) *Attorney, Agent, or Firm* — Michael Best & Friedrich LLP

(57) ABSTRACT

A battery cell (2) comprising at least one electrode unit (10) having an anode (82), a cathode (84) and a separator (83) which is arranged between the anode (82) and the cathode (84). In this case, the separator (83) has an electrically conductive core layer (93) and at least one ionically permeable edge layer (91, 92). The invention also relates to a method for controlling ion flow within the battery cell (2), wherein an electrical connection is established between the electrically conductive core layer (93) of the separator (83) and a current collector (81) of the anode (82) or a current collector (85) of the cathode (84).

7 Claims, 3 Drawing Sheets

(51) Int. Cl.
*H01M 10/42* (2006.01)
*H01M 10/44* (2006.01)
*H01M 2/34* (2006.01)
*H01M 4/02* (2006.01)

(56) References Cited

U.S. PATENT DOCUMENTS

2014/0087217 A1 3/2014 Zink et al.
2014/0329120 A1* 11/2014 Cui .................. H01M 10/48
 429/90
2015/0004450 A1 1/2015 Matsumura

FOREIGN PATENT DOCUMENTS

JP 2003217553 7/2003
WO 2011070712 6/2011

* cited by examiner

BATTERY CELL AND METHOD FOR CONTROLLING ION FLOW WITHIN THE BATTERY CELL

BACKGROUND OF THE INVENTION

The invention relates to a battery cell which comprises at least one electrode unit having an anode, a cathode and a separator which is arranged between the anode and the cathode. The invention also relates to a method for controlling ion flow within the battery cell.

Electrical energy can be stored by means of batteries. Batteries convert chemical reaction energy into electrical energy. A distinction is drawn between primary batteries and secondary batteries in this case. Primary batteries are functional only once, whereas secondary batteries, which are also called accumulators, are rechargeable. In this case, a battery comprises one or more battery cells.

In particular, so-called lithium-ion battery cells are used in an accumulator. The said lithium-ion battery cells are distinguished, amongst other things, by high energy densities, thermal stability and extremely low self-discharge. Lithium-ion battery cells are used, amongst other things, in motor vehicles, in particular in electric vehicles (EV), hybrid vehicles (Hybrid Electric Vehicles, HEV) and plug-in hybrid vehicles (Plug-in Hybrid Electric Vehicles, PHEV).

Lithium-ion battery cells have a positive electrode, which is also called the cathode, and a negative electrode, which is also called the anode. The cathode and the anode each comprise a current collector to which an active material is applied. The active material for the cathode is, for example, a metal oxide. The active material for the anode is, for example, graphite or silicon.

Lithium atoms are stored in the active material of the anode. During operation of the battery cell, that is to say during a discharging process, electrons in an outer electrical circuit flow from the anode to the cathode. During a discharging process, lithium ions migrate from the anode to the cathode within the battery cell. In the process, the lithium ions are extracted from the active material of the anode in a reversible manner, this also being called deintercalation. During a charging process of the battery cell, the lithium ions migrate from the cathode to the anode. In the process, the lithium ions are again inserted into the active material of the anode in a reversible manner, this also being called intercalation.

The electrodes of the battery cell are of foil-like design and, with the interposition of a separator which separates the anode from the cathode, are wound to form an electrode winding. An electrode winding of this kind is also called a jelly roll. The two electrodes of the electrode winding are electrically connected to poles of the battery cell, which are also called terminals, by means of collectors. A battery cell generally comprises one or more electrode units. The electrodes and the separator are surrounded by a generally liquid electrolyte. The electrolyte is conductive to the lithium ions and allows the lithium ions to be transported between the electrodes.

In the event of a fault, for example in the case of a short circuit or overcharging, there may be a temperature increase in the battery cells. Destruction of the electrolytes and shrinkage of the separator may occur at a sufficiently high temperature. This may consequently lead to destruction of the battery cell, possibly in the form of an explosion.

A battery cell of this generic type is disclosed in DE 10 2012 217 451 A1. The battery cell has a cell housing which is produced, for example, from a metal. The cell housing is of prismatic, in particular cuboidal, configuration and is of pressure-resistant design. The battery cell comprises a diaphragm which deforms in the event of an overpressure within the cell housing and in the process triggers a short circuit.

U.S. 2013/0017432 A1 discloses a separator for battery cells. In this case, the separator is of multilayer construction, wherein individual layers have patterns with openings which are arranged in an offset, in particular complementary, manner in relation to one another.

U.S. 2005/0208383 A1 discloses a separator which has a porous base material on one side of which or on both sides of which a resin structure is provided.

SUMMARY OF THE INVENTION

The invention proposes a battery cell comprising at least one electrode unit having an anode, a cathode and a separator which is arranged between the anode and the cathode. According to the invention, the separator has an electrically conductive core layer and at least one ionically permeable edge layer or edge layer which ions can penetrate.

The ionically permeable edge layer is, for example, a polymer or a ceramic. Other materials are also feasible. The core layer is preferably of metallic design. However, other electrically conductive materials, in particular graphite, are also feasible.

The electrically conductive core layer is preferably embedded between a first ionically permeable edge layer and a second ionically permeable edge layer. Therefore, the two edge layers surround the core layer on both sides.

According to an advantageous refinement of the invention, the electrically conductive core layer is in the form of a perforated metal foil. The relatively small holes which are present in the metal foil are permeable to lithium ions. Therefore, the separator is ionically permeable, that is to say ions can penetrate the said separator.

According to another advantageous refinement of the invention, the electrically conductive core layer is in the form of a foamed metal foil. The metal foil therefore has a degree of porosity and is therefore permeable to lithium ions. Therefore, the separator is ionically permeable.

According to a further advantageous refinement of the invention, the electrically conductive core layer is of lattice-like design. The said electrically conductive core layer is, in particular, a graphite layer which has a lattice with intermediate spaces. The said intermediate spaces between the lattice of the graphite layer are permeable to lithium ions. Therefore, the separator is ionically permeable.

The invention further proposes a method for controlling ion flow within a battery cell according to the invention. In the said method, an electrical connection is established between the electrically conductive core layer of the separator and a current collector of the anode or between the electrically conductive core layer of the separator and a current collector of the cathode. An electrical circuit arrangement of the electrode unit of the battery cell of this kind allows control of an electric field between the anode and the cathode and also control of the ion flow between the anode and the cathode.

According to an advantageous refinement of the invention, the electrically conductive core layer of the separator and the current collector of the cathode are short-circuited. Therefore, the core layer of the separator and the current collector of the cathode are electrically at the same potential. Therefore, there is no electric field between the core layer of the separator and the current collector of the cathode. As a result, ion flow between the separator and the cathode is not possible. Therefore, ion flow between the anode and the separator is not possible either.

According to another advantageous refinement of the invention, the electrically conductive core layer of the separator and the current collector of the anode are short-circuited. Therefore, the core layer of the separator and the current collector of the anode are electrically at the same potential. Therefore, there is no electric field between the core layer of the separator and the current collector of the anode. As a result, ion flow between the separator and the anode is not possible. Therefore, ion flow between the cathode and the separator is not possible either.

According to an advantageous development of the invention, a voltage source, in particular a DC voltage source, is connected between the electrically conductive core layer of the separator and the current collector of the cathode. In particular, a positive pole of the DC voltage source is connected to the core layer of the separator, and a negative pole of the DC voltage source is connected to the current collector of the cathode in this case. Therefore, the core layer of the separator is electrically at a higher potential than the current collector of the cathode. The core layer of the separator is likewise electrically at a higher potential than the current collector of the anode. Therefore, there is an electric field between the core layer of the separator and the current collector of the cathode, and there is an electric field between the core layer of the separator and the current collector of the anode. As a result, ion flow initially takes place from the separator to the cathode and also from the separator to the anode. The ion flow ends once an equilibrium is established within the electrode unit.

According to another advantageous development of the invention, a voltage source, in particular a DC voltage source, is connected between the electrically conductive core layer of the separator and the current collector of the anode. In particular, a negative pole of the DC voltage source is connected to the core layer of the separator, and a positive pole of the DC voltage source is connected to the current collector of the anode in this case. Therefore, the core layer of the separator is electrically at a lower potential than the current collector of the anode. The core layer of the separator is likewise electrically at a lower potential than the current collector of the cathode. Therefore, there is an electric field between the current collector of the anode and the core layer of the separator, and there is an electric field between the current collector of the cathode and the core layer of the separator. As a result, ion flow initially takes place from the anode to the separator and also from the cathode to the separator. The ion flow ends once an equilibrium is established within the electrode unit.

A battery cell according to the invention is advantageously used in an electric vehicle (EV), in a hybrid vehicle (HEV) or in a plug-in hybrid vehicle (PHEV). It is also feasible to use the said battery cell in a stationary battery, in an aircraft or in a battery in a marine application.

The method according to the invention is advantageously used in a battery cell of an electric vehicle (EV), in a hybrid vehicle (HEV) or in a plug-in hybrid vehicle (PHEV). It is also feasible to use the said battery cell in a stationary battery or in a battery in a marine application.

The method according to the invention permits ion flow within the electrode unit of the battery cell to be suppressed relatively quickly. As a result, no electrons can flow from the anode to the cathode in an outer electrical circuit either. A chain reaction and also further destruction of the battery cell are prevented, that is precluded, by terminating the current flow.

BRIEF DESCRIPTION OF THE DRAWINGS

Embodiments of the invention will be explained in greater detail on the basis of the drawings and the following description.

In the drawings.

DETAILED DESCRIPTION

Figure 1:
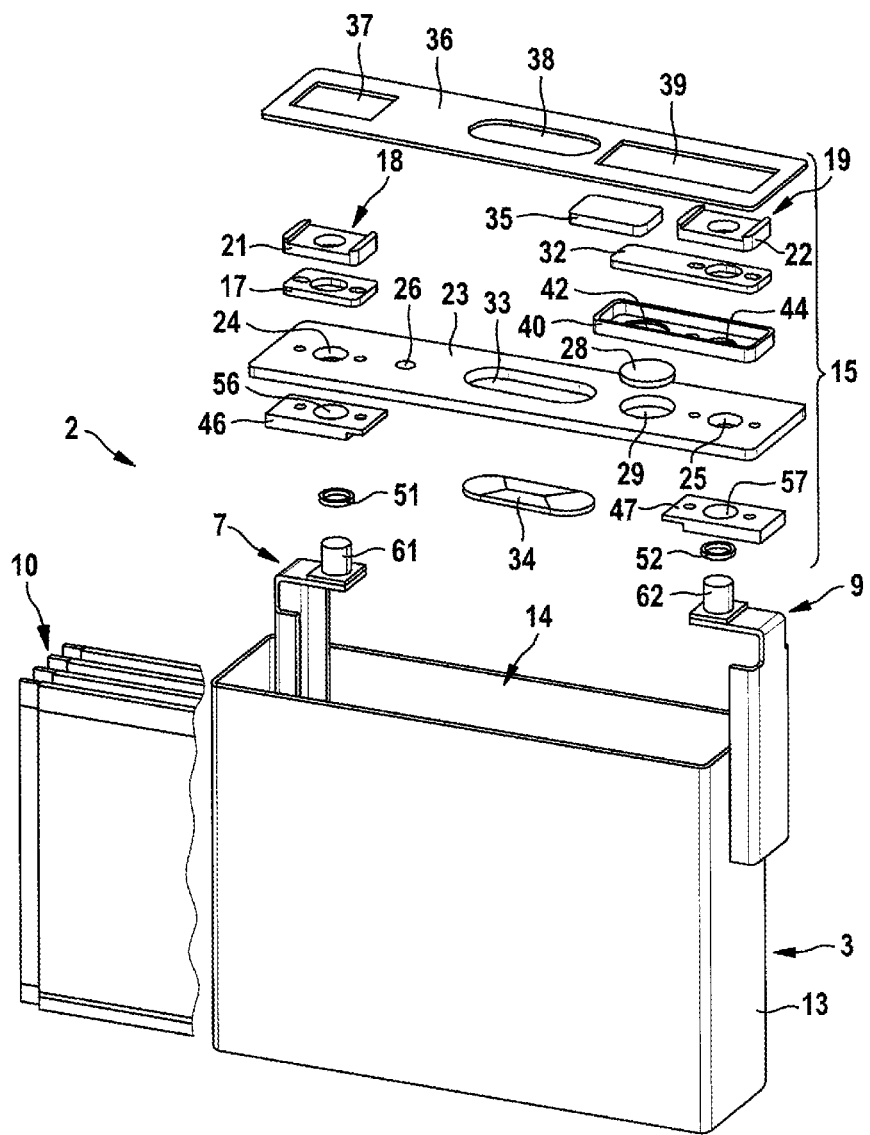
FIG. 1: is an exploded illustration of a battery cell according to the invention.

FIG. 1 is an exploded illustration of a battery cell 2. The battery cell 2 comprises a cell housing 3 which is of prismatic, in the present case cuboidal, design. In the present case, the cell housing 3 is of electrically conductive design and is produced, for example, from aluminum. The cell housing 3 comprises a cuboidal container 13 which has a container opening 14 on one side. The container opening 14 is closed by a cover arrangement 15 which comprises, amongst other things, a covering plate 23 which, in the present case, is likewise of electrically conductive design and is produced, for example, from aluminum.

The cuboidal container 13 and the covering plate 23 of the cell housing 3 are electrically and mechanically connected, in particular welded, to one another in this case. Other shapes for the cell housing 3, for example cylindrical, in particular circular-cylindrical, are also feasible.

The battery cell 2 comprises a negative terminal 21 and a positive terminal 22. A voltage which is provided by the battery cell 2 can be tapped off via the terminals 21, 22. Furthermore, the battery cell 2 can also be charged via the terminals 21, 22. The terminals 21, 22 are arranged at a distance from one another on the covering plate 23 of the prismatic cell housing 3.

An electrode unit 10 which has two electrodes, specifically an anode 82 and a cathode 84, is arranged within the cell housing 3 of the battery cell 2. It is also feasible for a plurality of electrode units 10 to be provided in the cell housing 3. The cell housing 3 of the battery cell 2 is filled with a liquid electrolyte which surrounds the electrode unit 10. After assembly of the cell housing 3, the electrolyte is poured into the cell housing 3 through a filling opening 26 in the covering plate 23. The filling opening 26 is then closed by means of a sealing plug, not illustrated.

The anode 82 comprises a current collector 81 which extends beyond an edge of the electrode unit 10 on a first narrow side and is connected to a first collector 7. The current collector 81 of the anode 82 is electrically connected to the negative terminal 21 of the battery cell 2 by means of the first collector 7.

The cathode 84 comprises a current collector 85 which extends beyond an edge of the electrode unit 10 on a second narrow side, which is situated opposite the first narrow side, and is connected to a second collector 9. The current collector 85 of the cathode 84 is electrically connected to the positive terminal 22 of the battery cell 2 by means of the second collector 9.

The first collector 7, which is located within the cell housing 3, is connected to the negative terminal 21, which is located outside the cell housing 3, by means of a first contact arrangement 18. The second collector 9, which is located within the cell housing 3, is connected to the positive terminal 22, which is located outside the cell housing 3, by means of a second contact arrangement 19.

The first collector 7 is connected to a first connection bolt 61 which projects away from the first collector 7 on a side which is averted from the electrode unit 10. In this case, the first connection bolt 61 projects through a first covering opening 24 in the covering plate 23 of the cover arrangement 15 and, at its end which is averted from the first collector 7, is connected to the negative terminal 21.

The second collector 9 is connected to a second connection bolt 62 which projects away from the second collector 9 on a side which is averted from the electrode unit 10. In this case, the second connection bolt 62 projects through a second covering opening 25 in the covering plate 23 of the cover arrangement 15 and, at its end which is averted from the second collector 9, is connected to the positive terminal 22.

In the present case, the cover arrangement 15 comprises a potential plate 17 which is of electrically conductive design and which is arranged between the covering plate 23 and the negative terminal 21. The potential plate 17 electrically connects the covering plate 23 to the negative terminal 21. Therefore, the cell housing 3 is at the same electrical potential as the negative terminal 21.

An insulation which electrically insulates the covering plate 23 from the negative terminal 21 can also be provided instead of the potential plate 17. In this case, the cell housing 3 and the negative terminal 21 can be at different electrical potentials.

The cover arrangement 15 further comprises a connecting plate 32 which is likewise of electrically conductive design and which is arranged between the covering plate 23 and the positive terminal 22. The connecting plate 32 is electrically connected to the positive terminal 22. Furthermore, a connecting plate insulation 35 is fitted, in the present case adhesively bonded, on that side of the connecting plate 32 which is averted from the covering plate 23, laterally next to the positive terminal 22.

A spacing insulator 40 which electrically insulates the covering plate 23 from the connecting plate 32 and the positive terminal 22 is provided between the covering plate 23 and the connecting plate 32. The spacing insulator 40 has a passage opening 44, the second connection bolt 62 projecting through the said passage opening.

The cover arrangement 15 also comprises a cover plate insulating film 36 which is adhesively bonded on that side of the covering plate 23 which is averted from the container 13. The cover plate insulating film 36 has a first film opening 37, the negative terminal 21 and the potential plate 17 projecting through the said first film opening. The cover plate insulating film 36 also has a second film opening 38, the function of the said second film opening being discussed later. The cover plate insulating film 36 also has a third film opening 39, the positive terminal 22, the connecting plate 32, the connecting plate insulation 35 and the spacing insulator 40 projecting through the said third film opening.

A first connection insulator 46 which electrically insulates the covering plate 23 from the first collector 7 is provided between the covering plate 23 and the first collector 7. The first connection insulator 46 has a first insulator opening 56, the first connection bolt 61 passing through the said first insulator opening.

A second connection insulator 47 which electrically insulates the covering plate 23 from the second collector 9 is provided between the covering plate 23 and the second collector 9. The second connection insulator 47 has a second insulator opening 57, the second connection bolt 62 passing through the said second insulator opening.

A first sealing ring 51 is arranged between the first connection bolt 61 and the covering plate 23. In this case, the first sealing ring 51 is placed around the first connection bolt 61 and is located in the first covering opening 24 in the covering plate 23. The first sealing ring 51 electrically insulates the first connection bolt 61 from the covering plate 23. The first sealing ring 51 additionally seals off the first covering opening 24 in an air-tight and liquid-tight manner. This prevents, in particular, moisture from entering the cell housing 3 through the first covering opening 24 and also electrolyte from escaping from the cell housing 3 through the first covering opening 24.

A second sealing ring 52 is arranged between the second connection bolt 62 and the covering plate 23. In this case, the second sealing ring 52 is placed around the second connection bolt 62 and is located in the second covering opening 25 in the covering plate 23. The second sealing ring 52 electrically insulates the second connection bolt 62 from the covering plate 23. The second sealing ring 52 additionally seals off the second covering opening 25 in an air-tight and liquid-tight manner. This prevents, in particular, moisture from entering the cell housing 3 through the second covering opening 25 and also electrolyte from escaping from the cell housing 3 through the second covering opening 25.

The covering plate 23 of the cell housing 3 further comprises a bursting opening 33 which is closed by a bursting disk 34. In the event of an overpressure within the cell housing 3, the bursting disk 34 opens, as a result of which the overpressure can escape to the outside through the bursting opening 33. This prevents the cell housing 3 from bursting. In this case, the bursting opening 33 in the covering plate 23 is in alignment with the second film opening 38 in the cover plate insulating film 36.

In the present case, the battery cell 2 also has an overcharge safety device (OSD). The overcharge safety device comprises an OSD opening 29 which is provided in the covering plate 23 of the cell housing 3 and is closed by an OSD diaphragm 28. The OSD diaphragm 28 is designed as a thin metal foil. In the event of an overpressure within the cell housing 3, which overpressure can occur, for example, owing to a temperature increase as a result of overcharging of the battery cell 2, the OSD diaphragm 28 deforms and, in the process, makes contact with the connecting plate 32. The spacing insulator 40 has a short-circuit opening 42 for this purpose, it being possible for the OSD diaphragm 28 to pass through the said short-circuit opening when it deforms. This creates a short circuit between the cell housing 3 and the second collector 9, as a result of which a charging process of the battery cell 2 is interrupted.

Figure 2:
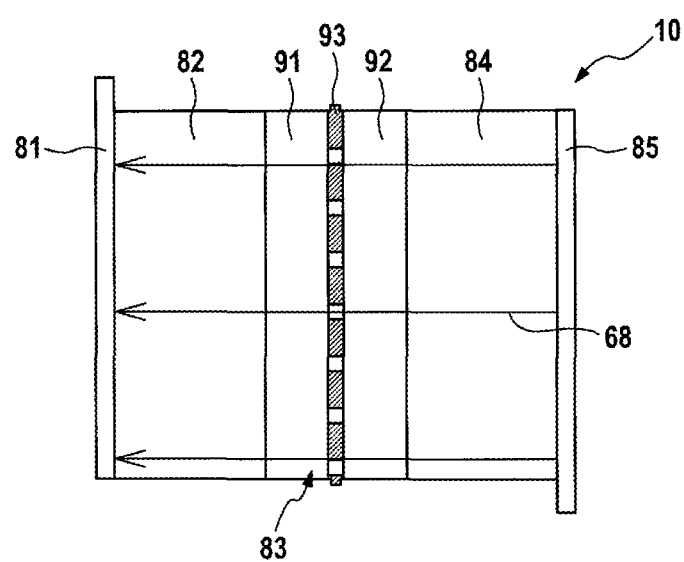
FIG. 2: is a schematic illustration of an electrode unit of the battery cell from FIG. 1, FIG. 3: is a schematic illustration of the electrode unit from FIG. 2 with a first circuit arrangement for controlling the ion flow.

FIG. 2 schematically shows the electrode unit 10 of the battery cell 2 from FIG. 1. In the present case, the electrode unit 10 is designed as an electrode winding. The anode 82 and the cathode 84 are each of foil-like design and, with the interposition of a separator 83, are wound to form the electrode winding. However, other designs of the electrode unit 10, for example as an electrode stack, are also feasible.

The anode 82 comprises an anodic active material which is of foil-like design. The anodic active material comprises silicon or a silicon-containing alloy as base material. The current collector 81 of the anode 82 is of electrically conductive design and is produced from a metal, for example from copper. The anodic active material and the current collector 81 are placed flat against one another and connected to one another.

The cathode 84 comprises a cathodic active material which is of foil-like design. The cathodic active material comprises a metal oxide, for example lithium cobalt oxide (LiCoO2), as base material. The current collector 85 of the cathode 84 is of electrically conductive design and is produced from a metal, for example from aluminum. The cathodic active material and the current collector 85 are placed flat against one another and connected to one another.

The separator 83 is arranged between the anodic active material and the cathodic active material. The anodic active material is therefore located between the separator 83 and the current collector 81 of the anode 82, and the cathodic active material is located between the separator 83 and the current collector 85 of the cathode 84.

The separator 83 is likewise of film-like design and is ionically permeable, that is to say lithium ions can penetrate the said separator. The separator 83 is of multilayer, in the present case three-layer, construction. The separator 83 comprises an electrically conductive core layer 93 which is embedded between a first ionically permeable edge layer 91 and a second ionically permeable edge layer 92.

The battery cell 2 is charged in the state illustrated here. The current collector 85 of the cathode 84 is at an electrically higher potential than the current collector 81 of the anode 82. This creates an electric field 68 between the current collector 85 of the cathode 84 and the current collector 81 of the anode 82.

Figure 3:
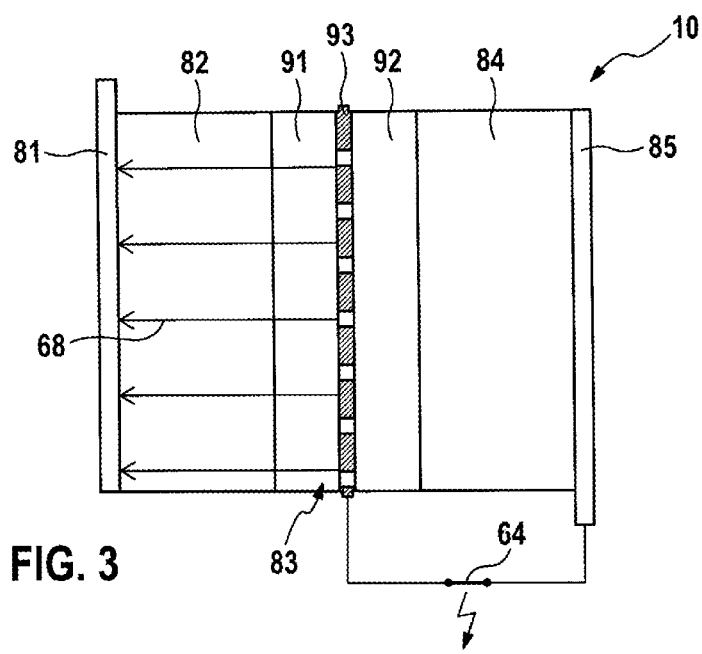

FIG. 3 schematically shows the electrode unit 10 from FIG. 2 with a first circuit arrangement in the form of an electrical connection for controlling the ion flow. The electrically conductive core layer 93 of the separator 83 and the current collector 85 of the cathode 84 are short-circuited in this case, this being shown by a closed switch 64 in conjunction with a lightning symbol in FIG. 3.

The current collector 85 of the cathode 84 and the core layer 93 of the separator 83 are electrically at the same potential, and the current collector 81 of the anode 82 is electrically at a lower potential. Therefore, there is an electric field 68 between the core layer 93 of the separator 83 and the current collector 81 of the anode 82. However, there is no electric field between the current collector 85 of the cathode 84 and the core layer 93 of the separator 83. As a result, ion flow between the separator 83 and the cathode 84 is not possible, and therefore ion flow between the anode 82 and the separator 83 is not possible either.

It is also feasible to short-circuit the electrically conductive core layer 93 of the separator 83 and the current collector 81 of the anode 82. In this case, the current collector 81 of the anode 82 and the core layer 93 of the separator 83 are electrically at the same potential, and the current collector 85 of the cathode 84 is electrically at a higher potential. Therefore, there is an electric field 68 between the current collector 85 of the cathode 84 and the core layer 93 of the separator 83. However, there is no electric field between the core layer 93 of the separator 83 and the current collector 81 of the anode 82. As a result, ion flow between the anode 82 and the separator 83 is not possible, and therefore ion flow between the separator 83 and the cathode 84 is not possible either.

Figure 4:
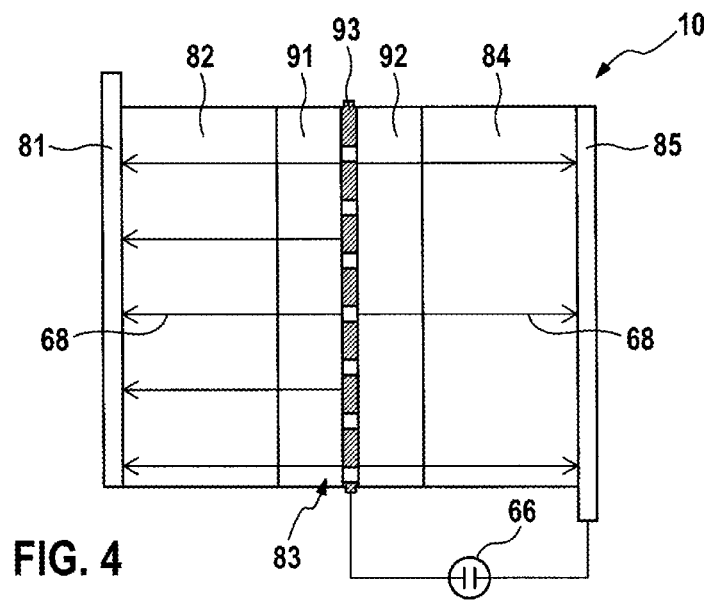
FIG. 4: is a schematic illustration of the electrode unit from FIG. 2 with a second circuit arrangement for controlling the ion flow.

FIG. 4 schematically shows the electrode unit 10 from FIG. 2 with a second circuit arrangement in the form of an electrical connection for controlling the ion flow. In the said figure, a voltage source 66 in the form of a DC voltage source is connected between the electrically conductive core layer 93 of the separator 83 and the current collector 85 of the cathode 84. In this case, the positive pole of the voltage source 66 is connected to the core layer 93 of the separator 83, and the negative pole of the voltage source 66 is connected to the current collector 85 of the cathode 84.

The core layer 93 of the separator 83 is therefore electrically at a higher potential than the current collector 85 of the cathode 84 and than the current collector 81 of the anode 82. Therefore, there is an electric field 68 between the core layer 93 of the separator 83 and the current collector 85 of the cathode 84, and there is an electric field 68 between the core layer 93 of the separator 83 and the current collector 81 of the anode 82. As a result, ion flow between the anode 82 and the cathode 84 is not possible.

It is also possible to connect a voltage source 66 in the form of a DC voltage source between the electrically conductive core layer 93 of the separator 83 and the current collector 81 of the anode 82. In this case, the negative pole of the voltage source 66 is connected to the core layer 93 of the separator 83, and the positive pole of the voltage source 66 is connected to the current collector 81 of the anode 82. The core layer 93 of the separator 83 is therefore electrically at a lower potential than the current collector 85 of the cathode 84 and than the current collector 81 of the anode 82. Therefore, there is an electric field 68 between the current collector 85 of the cathode 84 and the core layer 93 of the separator 83, and there is an electric field 68 between the current collector 81 of the anode 82 and the core layer 93 of the separator 83. As a result, ion flow between the anode 82 and the cathode 84 is not possible either.

The invention is not restricted to the exemplary embodiments described here and the aspects highlighted therein. Rather, a large number of modifications which lie within the scope of practice of a person skilled in the art are possible within the scope specified by the claims.

What is claimed is:

1. A battery cell (2) comprising at least one electrode unit (10) having an anode (82), a cathode (84) and a separator (83) between the anode (82) and the cathode (84), characterized in that the separator (83) has an electrically conductive core layer (93) and at least one ionically permeable edge layer (91, 92), wherein the electrically conductive core layer (93) is in the form of a foamed metal foil.

2. The battery cell (2) according to claim 1, characterized in that the electrically conductive core layer (93) is embedded between the at least one ionically permeable edge layer (91) and a second ionically permeable edge layer (92).

3. A method for controlling ion flow within a battery cell (2) according to claim 1, wherein an electrical connection is established between the electrically conductive core layer (93) of the separator (83) and one of a current collector (81) of the anode (82) and a current collector (85) of the cathode (84).

4. The method according to claim 3, characterized in that the electrically conductive core layer (93) and the current collector (85) of the cathode (84) are short-circuited.

5. The method according to claim 3, characterized in that the electrically conductive core layer (93) and the current collector (81) of the anode (82) are short-circuited.

6. The method according to claim 3, characterized in that a voltage source (66) is connected between the electrically conductive core layer (93) and the current collector (85) of the cathode (84).

7. The method according to claim 3, characterized in that a voltage source (66) is connected between the electrically conductive core layer (93) and the current collector (81) of the anode (82).

\* \* \* \* \*